US007082305B2

(12) United States Patent
Willars et al.

(10) Patent No.: US 7,082,305 B2
(45) Date of Patent: Jul. 25, 2006

(54) METHOD AND APPARATUS FOR GENERATING A NEIGHBOR CELL LIST

(75) Inventors: Per Hans Åke Willars, Stockholm (SE); Bengt Gunnar Harald Persson, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 202 days.

(21) Appl. No.: 10/715,842

(22) Filed: Nov. 19, 2003

(65) Prior Publication Data

US 2004/0152480 A1 Aug. 5, 2004

Related U.S. Application Data

(60) Provisional application No. 60/428,238, filed on Nov. 22, 2002.

(51) Int. Cl.
*H04Q 7/20* (2006.01)

(52) U.S. Cl. ............... 455/441; 455/436; 455/440; 455/444; 455/513; 455/552.1; 700/64; 342/357.09

(58) Field of Classification Search ............... 455/441, 455/444, 456.1, 436, 513, 552.1; 700/64; 342/357.09
See application file for complete search history.

(56) References Cited

U.S. PATENT DOCUMENTS

| 5,239,667 | A | * | 8/1993 | Kanai ........................ 455/10 |
| 5,327,575 | A | * | 7/1994 | Menich et al. ............... 455/437 |
| 5,345,499 | A | * | 9/1994 | Benveniste ................. 455/449 |
| 5,854,981 | A | * | 12/1998 | Wallstedt et al. ........... 455/439 |
| 5,946,621 | A | * | 8/1999 | Chheda et al. .............. 455/440 |
| 6,014,565 | A | * | 1/2000 | Bonta ........................ 455/437 |
| 6,131,030 | A | | 10/2000 | Schon et al. |
| 6,351,642 | B1 | * | 2/2002 | Corbett et al. ............... 455/442 |
| 2002/0042279 | A1 | * | 4/2002 | Da Rocha et al. ........... 455/456 |
| 2004/0157600 | A1 | * | 8/2004 | Stumpert et al. ........... 455/432.1 |

FOREIGN PATENT DOCUMENTS

| EP | 0 986 279 | 9/1998 |
| WO | WO 00/38466 | 6/2000 |
| WO | WO 02/37733 | 11/2001 |

* cited by examiner

*Primary Examiner*—Jean Gelin
*Assistant Examiner*—Ariel Balaoing
(74) *Attorney, Agent, or Firm*—Nixon & Vanderhye P.C.

(57) ABSTRACT

A user equipment (UE) communicates with at least one cell defining an active set. A velocity vector including position, speed, and direction is associated with the UE. A radio network controller receives information related to the velocity vector and creates a filtered neighbor cell list by filtering a neighbor cell list associated with the active set. The filtering depends on the velocity vector related information. The controller transmits the filtered neighbor cell list to the user equipment so that pilot signal strength is measured for cells in that list.

28 Claims, 4 Drawing Sheets

METHOD AND APPARATUS FOR GENERATING A NEIGHBOR CELL LIST

RELATED APPLICATIONS

Priority is claimed to provisional application 60/428,238, filed on Nov. 22, 2002, the contents of which are incorporated by reference.

FIELD OF THE INVENTION

The present invention relates to a controller, a user equipment and methods in these, in a radio network including a number of cells, in which network a user equipment is in communication with at least one cell defining an active set.

BACKGROUND

Cellular communication systems conventionally include a plurality of base stations arranged in a pattern so as to define a plurality of overlapping cells which provide radio communication support in a geographic area. A remote transmitter/receiver unit, such as a user equipment, communicates with the base station of the corresponding cell in which the user equipment resides. This communication typically occurs through a channel assigned to the connection by the system. When the user equipment is mobile, or when the base station is non-stationary (e.g. an orbiting satellite), the user equipment may transition between adjacent cells due to the relative movement between the user equipment and the base station.

Absent some intervention by the system, this transitioning would eventually terminate the connection because the received signal strength associated with the signals would diminish to a level where either the base station or remote station cannot adequately receive the other's transmissions to decode information associated therewith. Transitioning between cells can additionally cause a significant degradation in signal quality. This signal quality degradation is typically measured at the user equipment by a quality measure such as bit error rate (BER). Signal quality degradation and termination of communication due to inadequate signal strength represent aspects of the cell transition problem in mobile cellular communications.

A solution to these aspects of the cell transition problem is commonly called "handover." This conventional technique "hands off" an in-process communication with a user equipment from one base station in a first cell to another base station in another cell. This hand-over process maintains the continuity of the connection and prevents the termination of the call when the user equipment is moving from one cell to another. The hand-over process may be accomplished using a number of system dependent methods.

In a CDMA (Code Division Multiple Access) system, a user equipment may maintain a connection with more than one base station at a time in a process known as soft hand-over. In soft hand-over, the user equipment maintains simultaneous connection with more than one base station so as to induce a diversity effect that improves the quality of the connection. This diversity effect is achieved through communication with different base stations over different air-interface paths that have different fading properties. The combination of signals over the different air-interface paths can improve the quality of the connection and can reduce transmission power requirements between the base and user equipment.

Soft hand-over in a CDMA (Code Division Multiple Access) system such as, for example IS-95, conventionally involves measurements of known pilot signals transmitted from base stations in the system. A user equipment measures the signal quality of received pilot signals to determine which base station is suitable to serve that user equipment. When the user equipment selects a base station that is associated with a preferred signal quality measurement, the user equipment demodulates the transmitted paging channel from that base station and then receives system parameter information from the base station.

The system parameter information received from the base station includes a list of neighbor cells that is transmitted from the base station to the user equipment on the paging channel in different messages such as the neighbor list message, the extended neighbor list message, or the general neighbor list message.

Upon receipt of any of these messages, the user equipment stores the list of neighbor cells as its neighbor set. The user equipment then measures the received signal quality of the pilot signal from each base station in the neighbor set. Those base stations with pilot signals that have signal qualities above certain thresholds are then stored in a candidate set. Pilot signals from base stations in the candidate set are then measured by the user equipment more frequently than the base stations in the neighbor set.

During an actual call from the user equipment, the individual or plurality of base stations in the candidate set that has the best signal quality are stored in an active set. The base stations currently designated in the active set become the soft hand-over legs for the communication. When the signal quality from the base stations in the legs of the soft hand-over drop below a certain threshold for a given time period, they are dropped from the active set.

Furthermore, base stations in the candidate set are added to the active set when their associated pilot signal quality reaches a certain threshold. A user path is then set up to the base station newly added to the active set. This soft hand-over process occurs continuously while a user equipment is on a call. A serving base station may subsequently revise the neighbor list for the user equipment operating on the traffic channel by sending a neighbor list update message or an extended neighbor list update message.

The conventional soft hand-over technique described above is deficient, however, because, for moving user equipments, some cells are more suitable hand-over leg candidates than others. If a user equipment is moving away from one or more base stations, the signal quality from these base stations may still be sufficient to cause them to be added to the active set. Thus a hand-over leg, in this instance, will be set-up only to be released again in a short time as the user equipment moves away from the base station. Therefore, every time a hand-over leg is added or removed, extra signalling is required which causes unnecessary signalling overhead in the system. Additionally, removal or addition of a hand-over leg requires the burdensome allocation and release of system resources.

This has been partly solved in WO 00/38466 by modifying the candidate set. User equipment location and velocity information is used to estimate the weighted probability of the user equipment arriving in neighboring cells. "Bias values" are then produced for the measurements for the cells that the user equipment is more likely to be entering in or be located in. These bias values are used to modify the signal quality measurements for the cells, and also to help determine which cells should be included or removed in the candidate set. A disadvantage with this bias value approach is that long messages containing the neighboring cells have to be sent, creating additional traffic in the cell. Further, this approach still requires a lot of calculations in the user equipment in addition to a lot of measurements.

In WO02/37733 measurements are only performed on the candidate set (called monitored set in the application). Thus, the neighbor set equals the candidate set. Each active set is associated with a predefined corresponding candidate set. This reduces the number of neighboring cells being sent and the measurements being made. A disadvantage with this is less flexibility, especially if anything happens in the network. Another disadvantage is a risk of missing important cells especially when the user equipment is moving fast.

In systems using FDMA (Frequency Division Multiple Access) or TDMA (Time Division Multiple Access), such as GSM (Global System for Mobile communications) different sets can also be considered to be used, even if that terminology is not used. However, what may be called the active set then includes only one cell, since only hard handover is used. Further, there is no distinction between a neighbor set and a candidate set. In EP 0 986 279, the neighbor cell list sent from the system consists of two parts; a first part with information on cells in a higher cell hierarchy, i.e. larger cells, and then a second part with information on cells in a lower cell hierarchy, i.e. smaller cells. The second part is modified depending on where the user equipment is positioned. Also in this application, each "active set" (i.e. serving cell) is associated with a predefined corresponding "candidate set", giving the same disadvantages.

U.S. Pat. No. 6,131,030 shows how cell handover information such as neighbor cell lists can be transferred in different parts of the system.

SUMMARY

The purpose of the invention is to find a solution that reduces the handover related signalling in a radio telecommunications system that can be used with any user equipment without losing flexibility.

A controller, such as e.g. a radio network controller, base station controller or similar, is arranged to receive information related to whole or part of a velocity vector including position, speed and direction from the user equipment. The controller is arranged to create a filtered neighbor cell list by filtering a neighbor cell list associated with an active set that the user equipment is using. This filtering depends on the velocity vector related information. The controller is arranged to transmit the filtered neighbor cell list to the user equipment, thereby enabling measurement of pilot signal strength for cells in the filtered neighbor cell list.

An advantage with this approach is that the message that the controller sends with the filtered neighbor cell list is shorter than it would have been without filtering. This occupies less of the radio interface. Further, the user equipment need not measure pilot signal strength for so many cells, but only for the most important cells and can thereby make the measurements more frequently. Greater flexibility is achieved since the filtered cell list may be updated also between handovers.

DETAILED DESCRIPTION

Figure 1A:
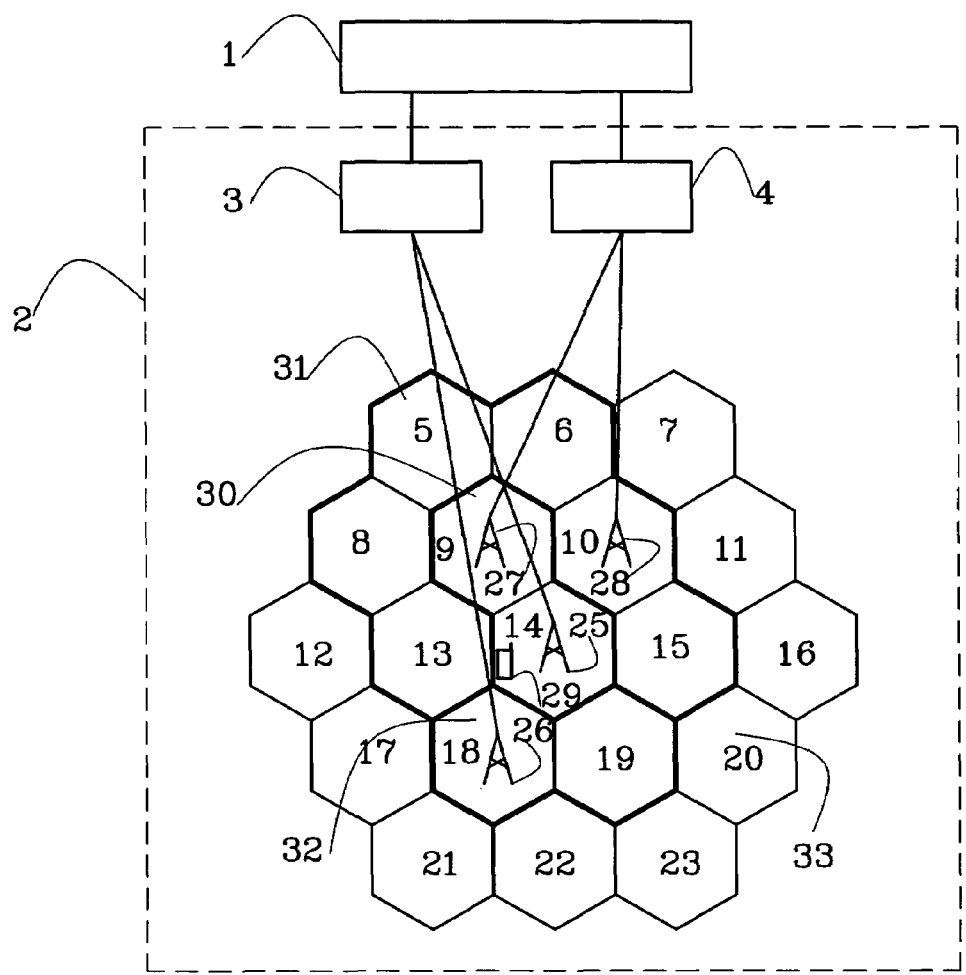
FIGS. 1a and b show a radio network system with different cell sets indicated.

In FIG. 1a is shown a mobile system including a core network 1 and a radio access network (RAN) 2. The RAN 2 is the part of the network that is responsible for the radio transmission and control of the radio connection. The RAN 2 includes a number of radio network controllers (RNC) 3, 4. The RNC may have other names in other mobile systems, such as base station controller.

The RNC 3, 4 controls radio resources and radio connectivity within a set of cells 9, 10, 14, 18. A cell 5, 6, 7, 8, 9, 10, 11, 12, 13, 14, 15, 16, 17, 18, 19, 20, 21, 22, 23 covers a geographical area. Each cell is identified by a unique identity, which is broadcast in the cell. The radio coverage in a cell is provided by equipment in a base station (BS) 25, 26, 27, 28, also called node B. A base station 25, 26, 27, 28 may handle the radio transmission and reception within one or more cells. For simplicity, this description will describe it as if there is one base station per cell. It is however to be noted that thus "a base station" in this context is considered equivalent also to "a part of a base station controlling a certain cell".

In FIG. 1a only two RNCs 3, 4 communicating with four BSs 25, 26, 27, 28 are drawn for the sake of clarity. The other cells are of course handled in a similar way. A radio network subsystem (RNS) includes a RNC 3 with its associated BSs 25, 26 and cells 14, 18. Further, the cells are, as is common, simplified drawn as hexagons. In practice, different cells have overlapping geographic areas, compare FIG. 2. Further, due to the surrounding environment the areas do not have that nice regular shape either. These irregularities is one reason behind the present invention.

Figure 2:
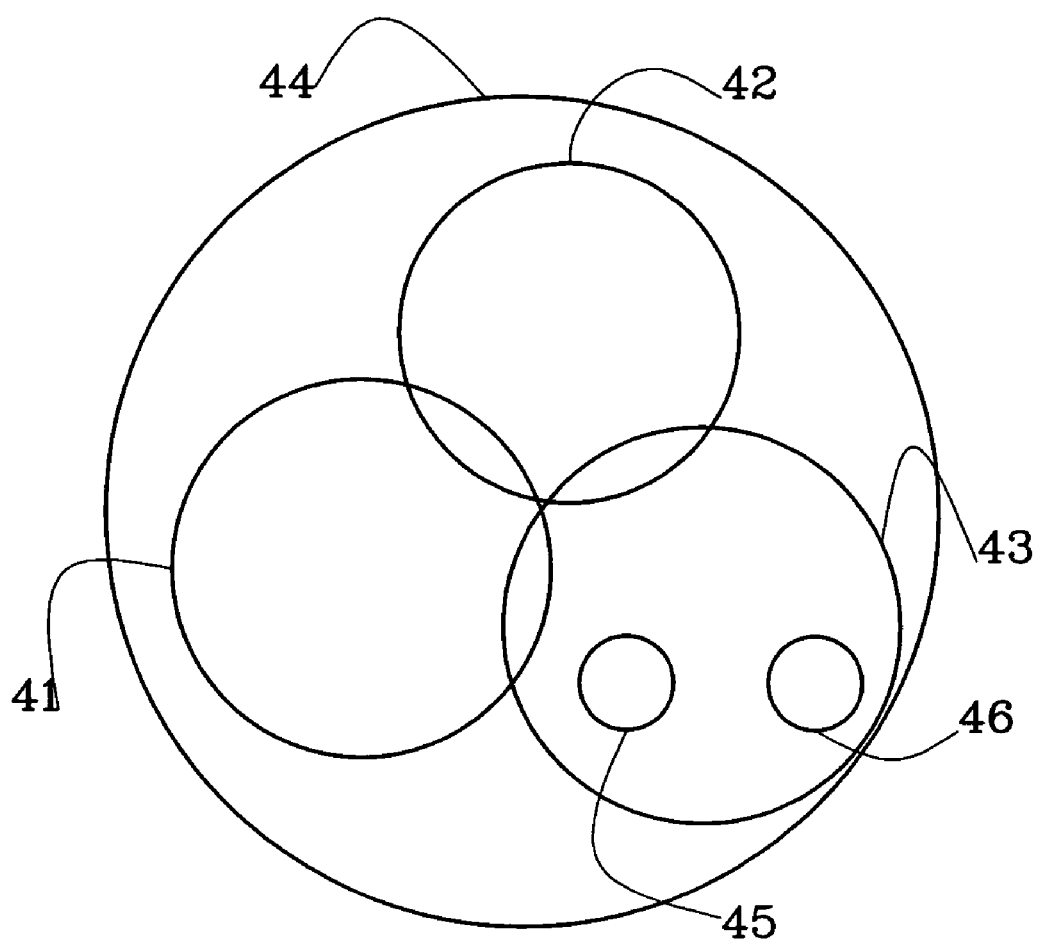
FIG. 2 shows cells on different hierarchical levels.

There may be more than one cell covering the same geographical area. An example is shown in FIG. 2, where a hierarchical cell structure is used. Microcells 41, 42, 43 are normally small cells covering areas with a radius of a few hundred meters. Macrocells 44, also called umbrella cells, normally covers a radius of 1 km or more. Picocells 45, 46 normally cover indoor areas with a cell radius of a few dozen meters. There may also be large satellite cells (not shown) controlled by satellites.

In FIG. 1a is also shown a user equipment (UE) 29, which may be e.g. a mobile terminal by which a user can access services offered by the core network 1. In FIG. 1a the UE 29 is communicating simultaneously with two BSs 25, 27 that thus serves an active set 30 of cells 9, 14. To make FIG. 1a clearer, different cell sets are also shown separately in FIG. 1b, with hatched markings. The active set 30 is marked with horizontal lines.

Figure 1B:
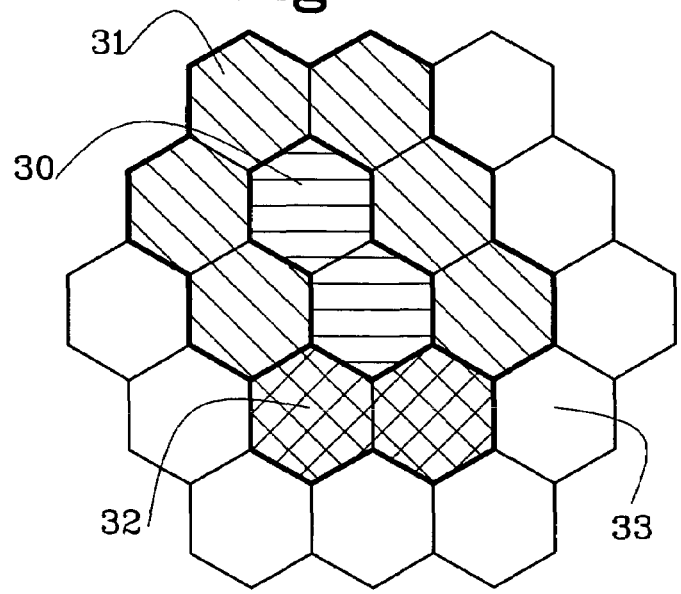

The cells 5, 6, 8, 10, 13, 15, 18, 19 that are near the active set 30—geographically near or near in a radio-fashioned way—are defined as the neighbor set 31, marked in FIG. 1b with lines angled to the left. The cells in the neighbor set 31 are potential choices for the active set 30.

Normally, a neighbor set is predefined in the RNC for each cell. What is interesting is however a neighbor set for the present active set. To obtain a neighbor set for an active set it is however easy to add the neighbor set information for the cells included in the active set. An equivalent—but more complex and memory-consuming—alternative would be to predefine a neighbor set for all conceivable active sets.

A cell list for the neighbor set 31—corresponding to the present active set—is sent from the RNC 3 to the UE 29. The UE 29 then measures pilot signals from the cells in the neighbor set 31. The cells 18, 19 with the strongest pilot tones are stored in a candidate set 32 and measured more frequently. The candidate set 32 is marked in FIG. 1b with lines angled to the right. Since the candidate set 32 is a subset of the neighbor set 31, they thus appear checkered. The remaining cells 7, 11, 12, 16, 17, 20, 21, 22, 23 and others not shown are then considered a remainder set 33.

FIGS. 1a and b only show cells on the same hierarchical level, but of course the cell sets may include cells from different hierarchical levels, e.g., both microcells and macrocell.

According to the invention the cell list for the neighbor set 31 should be filtered before being sent to the UE 29. The filtering should be made considering where the UE is and/or where it is likely that the UE will be in the future. A good way of doing this is to study the velocity vector of the UE 29. The velocity vector includes the current position of the UE 29 and its speed and direction. The speed and direction may of course be zero if the UE 29 is not moving. The different parts of the velocity vector might be given with different accuracy. It might e.g. be enough to know that the UE is within a certain area, without knowing its exact position.

A new filtered neighbor set could be made each time there is a handover. However, preferably it is made more often. An alternative is to update it at certain time intervals. Another alternative is to update it when the velocity vector of the UE has changed with a certain amount. A further alternative is to update it more often the faster the UE is moving, etc.

In order to know which cells to filter out and not, it may be advantageous for the RNC to have some extra information on the cells, e.g. which cells are near each other—near geographically and/or in a radio-fashioned way.

It is also possible to define certain areas of cells. In a network with cells on different hierarchical levels it may be advantageous for the RNC to have information on which type a certain cell is of—type in the meaning of being on a certain hierarchical level.

Further, in a network with cells using different radio access technologies (RAT) on different hierarchical levels it may be advantageous for the RNC to have information on the type of a cell, where type means using a certain RAT. Further, if the operator of the network cooperates with the operator of another network, and there thus may be neighboring cells belonging to different networks, then it may be advantageous for the RNC to have information on which network a cell belongs to. Also other information may be used for the filtering. How the information may be used will be described below.

Figure 3A:
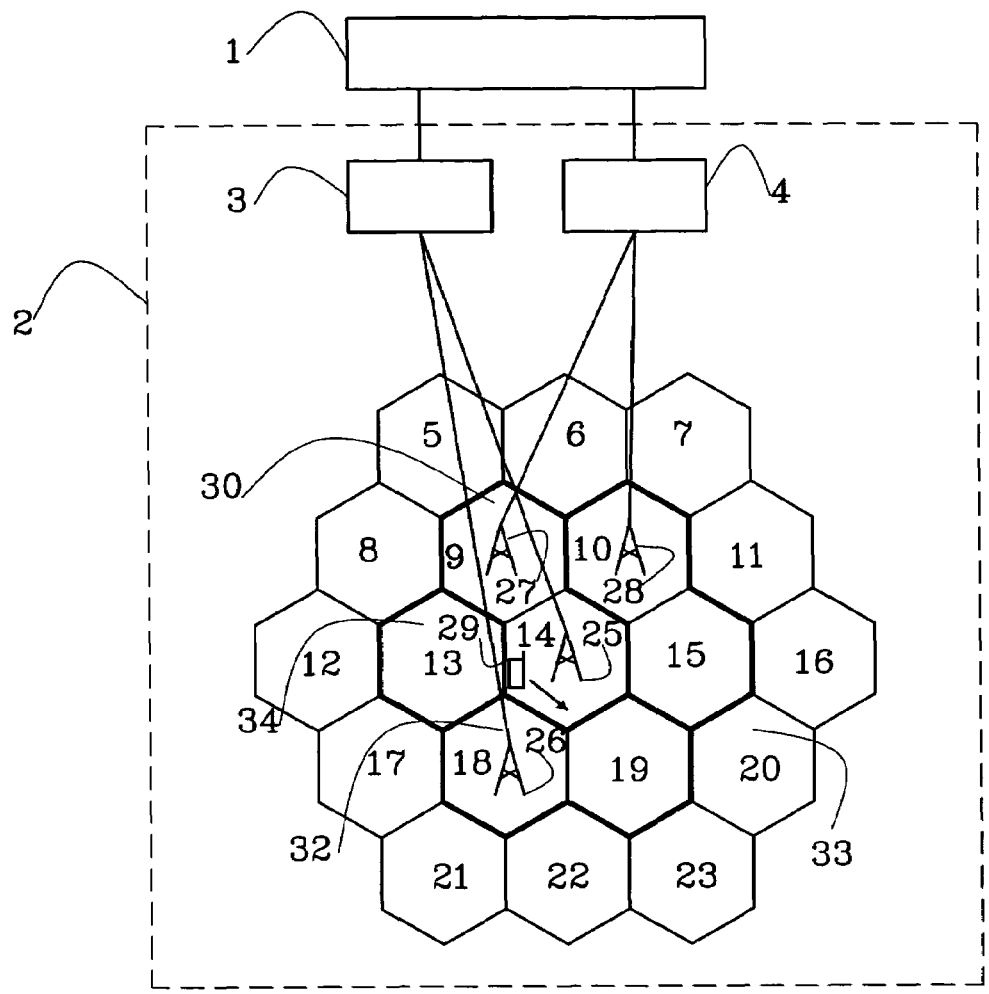
FIGS. 3a and b show a radio network system with different cell sets indicated, e.g. a filtered neighbor set.
Figure 3B:
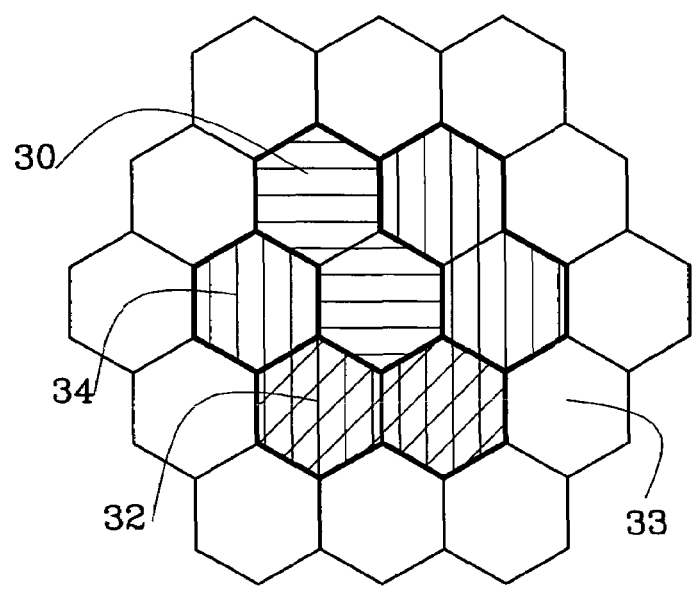

FIGS. 3a and 3b are similar to FIGS. 1a and 1b. The UE 29 positioned in cell 5 is far from cells 5 and 6. Thus, there is no need for making measurements for the neighbor cells 5 and 6. Thus, the RNC 3 can filter the neighbor set and transmit only a filtered neighbor set 32 without the cells 5 and 6.

As a further example, it may be noted that the UE 29 is moving towards cell 19. Thus, there is no need for making measurements for the neighbor cell 8 in the opposite direction either. Thus, the RNC 3 can filter the neighbor set and transmit only a filtered neighbor set 32 without the cells 5, 6 and 8. Said filtered neighbor set 32 is marked with vertical lines in FIGS. 3a and b instead of the unfiltered neighbor set 31 in FIGS. 1a and b. The UE 29 now only makes measurements on the filtered neighbor set 34.

How many cells to filter out—and thus exclude from measurement—from the neighbor set is of course a question that needs to be considered. The advantages of filtering out many cells are that the transmissions to the UE will be shorter and that the UE does not have to make so many measurements. The disadvantage is that if too many cells are filtered out, it is possible to miss good handover candidates, thus possibly decreasing the quality of a call.

In FIGS. 3a and 3b, it might be possible to filter out also cell 10, but if the adjacent cell 13 is filtered out because the UE is moving in almost the opposite direction, there may be a problem if the UE suddenly turns and travels in the opposite direction. Since cell 13 is very near, it is probably on the edge of becoming included in the candidate set. The reason that it is not already included in the candidate set is probably that the pilot signal from cell 19 for some reason is stronger than that from cell 13, which might happen even though cell 13 is closer geographically.

According to one example embodiment, the filtering can thus be made dependent on the position of the UE, as in FIGS. 3a and 3b. A distance threshold may be set, and cells lying further away may be filtered out. An alternative is to filter out cells not lying within a specified area. A further alternative is to set a level threshold on pilot signal strength and filter out the cells having with a pilot signal strength below said level threshold. The last alternative, however, requires that an earlier measurement have been made on pilot signal strength. A disadvantage with the last alternative is that said earlier measurement might not be sufficiently up to date and there is a danger that this may cause that interesting cells are unnecessarily excluded. The advantages may be bigger if combined with the geographically near alternative.

In another example embodiment, the direction of the UE is also taken into account, as in FIGS. 3a and 3b. In the latter, for one extreme case, only the cell or cells lying in the opposite direction of the direction that the UE is moving are filtered away. In the other extreme case only the cell or cells lying in the same direction as that the UE is moving are kept in the filtered neighbor set. Of course all variants in between are possible.

In another embodiment this is combined by looking at the speed of the UE. If the UE is moving fast it may be advantageous to keep more cells in the filtered neighbor set, because it is a greater likelihood that they will be reached in a short time. On the other hand, if the UE is moving slowly or not at all it may be advantageous to have fewer cells in the filtered neighbor set.

According to a further embodiment, when there are cells on different hierarchical levels as in FIG. 2, the filtering may be made differently on different hierarchical levels depending on the speed of the UE. If the UE is moving fast, then larger cells, such as macrocells, become more important than smaller cells, such as microcells and picocells. Since the UE will stay only for a short while in the smaller cells, is not of much use to handover to them. Thus, it is not of much use to measure the pilot signals of the smaller cells either. Thus, the faster the UE is moving, the more the larger cells should be prioritized, and thus, the more the smaller cells should be filtered out. If on the other hand, the UE is moving slowly or is still, it may be advantageous to use microcells and picocells. A simplified version would be to have a speed threshold. Above the speed threshold, e.g., microcells and picocells are filtered out, but macrocells are kept. Below the speed threshold, e.g., macrocells are filtered out, but microcells and picocells are kept.

How is the RNC going to know which velocity vector a UE has? There are several solutions to that and a few will be mentioned. According to one embodiment, for the position it is possible to use Global Positioning technology (GPS).

There exists a network assisted GPS (A-GPS), in which the network transmits some information to the UE, thus making the GPS function in the UE less complicated.

Another embodiment for estimating the position is to measure the round trip time (RTT), i.e., the time it takes for a signal to travel from a BS to the UE and back. This will give the distance from the BS. In the case of using one BS per cell, this will give a circle on which the UE may be. In the case of using one BS for more than one cell, this will give a circle segment on which the UE may be. This may be enough to exclude e.g. picocells lying far from the circle. To obtain a more accurate position, it is possible to measure the RTT relative to at least two BSs, which will give a crosspoint.

There exists another embodiment to estimate position when the UE receives signals from two or more BSs. It is then possible for the UE to measure the observed time difference of arrival (OTDOA) relative to said BSs, which will give a measure on the difference in distance to said BSs. Two BSs will give a curve on where the UE can be found, but three or more BSs will give a more accurate position.

A version of the OTDOA embodiment is to use OTDOA with idle period down link (OTDOA/IPDL). This is an improvement of the OTDOA, meaning that stronger signals from BSs may be shut down temporarily to enable measurement also on weaker signals.

In order to estimate speed and direction, the easiest way is probably to repeatedly measure position and draw conclusions from the changes. An alternative is to measure e.g. the Doppler effect on the frequency that will occur because the UE is moving. This will however give the speed relative to the BS. Thus, it might be more advantageous to make measurements relative to two BSs. A better alternative is to use the Doppler spread, which will give an estimation on the speed of the UE, even if measurements is only made relative to one BS.

According to a further embodiment the neighbor set can also be filtered considering which radio access technology (RAT) that is used in the neighboring cells. New UEs are often capable of communicating using more than one RAT, e.g. both CDMA and GSM. In order not to switch RAT to and from continuously, it is possible to prioritize the cells communicating in a predefined RAT, e.g. CDMA and filter out many of the other cells, but preferably not all. An alternative is to filter away many of the cells not communicating in the RAT that the UE is using at the moment, thus causing a kind of hysteresis in the change of RAT.

According to a further embodiment, where there are more than one network to chose from, similar solutions as with the RATs can be used.

Of course, all these embodiments may also be combined with each other.

An RNC may have different roles. This is explained in FIGS. 4a and b, which shows part of the system in FIG. 1a. For simplicity, let us say that the active set includes only one cell. It will work in a similar way also with active sets including more than one cell.

Figure 4A:
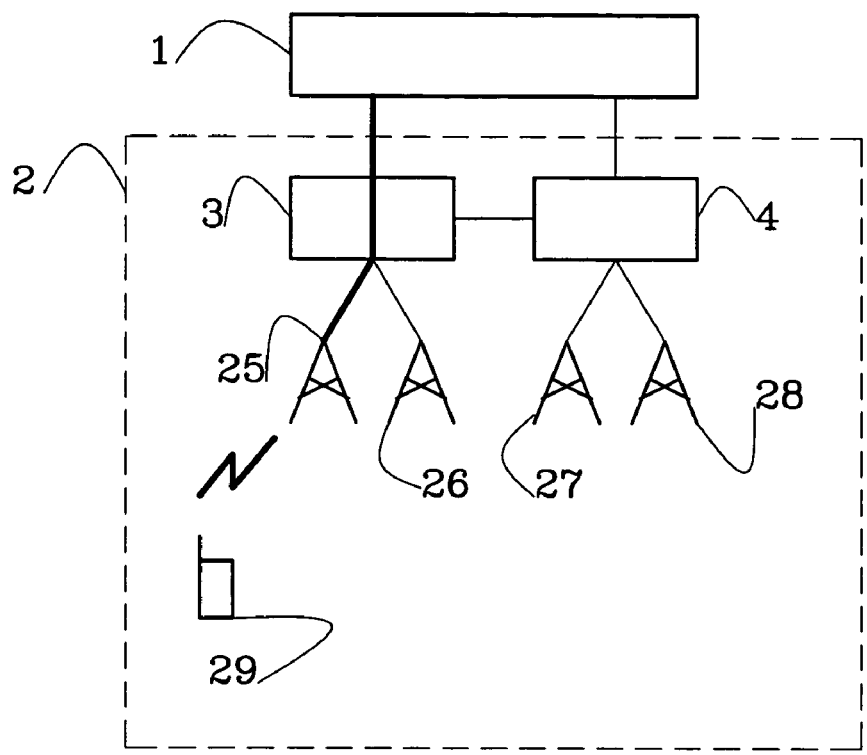
FIG. 4 shows the work share between a SRNC and a DRNC

As an example, see FIG. 4a, let us say that a call first is set up between the core network 1 and the UE 29 via the first RNC 3 and the first BS 25. This means that the first RNC 3 works as a serving RNC (SRNC). In this role the first RNC 3 is in charge of the connection with the UE, i.e. it has full control of said connection inside the RAN 2. The SRNC 3 is thus connected to the core network 1. The RAN 2 decides which RNC 3, 4 that will have the role of SRNC when the connection between UE 29 and RAN 2 is established. Normally, it will be the RNC 3 that controls the cell, where the connection to the UE 29 is initially established, that is assigned the SRNC role for this specific connection to the UE 29.

Figure 4B:
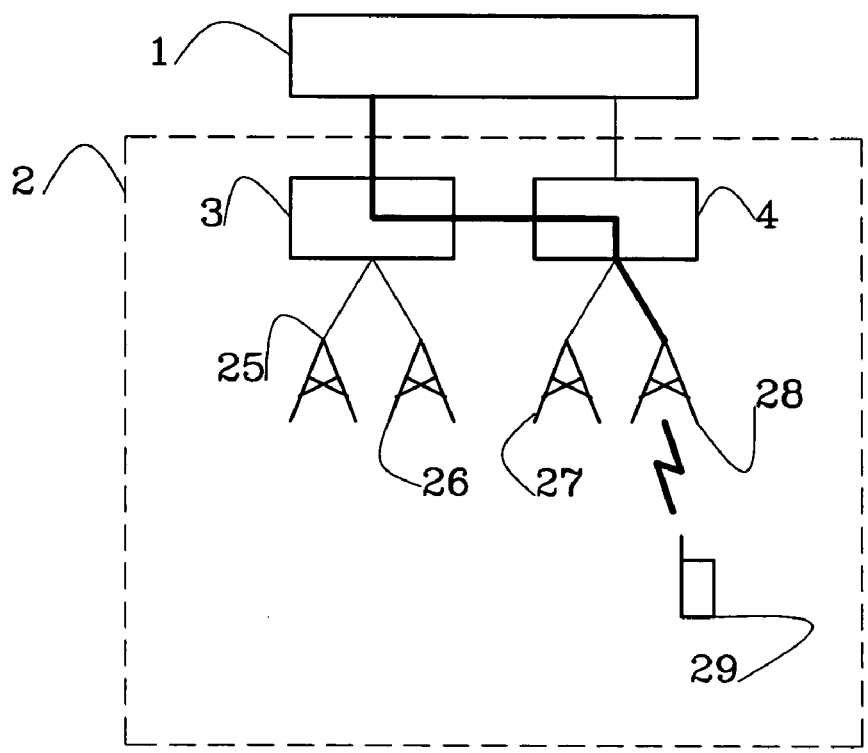

In FIG. 4b, the UE 29 has been handed over to the second BS 28, which is served by the second RNC 4. The first RNC 3, however, still has the role as SRNC. The second RNC 4 assumes a role as drift RNC (DRNC). In this role the second RNC 4 supports the SRNC 3 with radio resources for a connection with the UE 29, as long as the UE 29 needs radio resources in a cell or cells controlled by the DNRC 4. The concepts of SRNC and DRNC are also described in more detail in the previous mentioned U.S. Pat. No. 6,131,030, where it also is described an example on how to transfer handover information between different RNCs. It may be noted that there exists also the alternative to define a new SRNC when handover is performed, either each time or when the UE has moved a certain distance away from the original SRNC.

The invention may be implemented in different ways in the SRNC and DRNC. One embodiment is for the SRNC to request the DRNC to transmit its full cell list for the neighbor set for the active set in question to the SRNC. Extra information, such as cell type, as exemplified earlier, should also be transmitted. The SRNC is also informed of whole or parts of the velocity vector e.g. in one of the ways described above, when the SRNC is communicating with the UE. The SRNC then filters said neighbor cell list depending on the velocity vector information and transmits a filtered neighbor set to the UE.

Another embodiment is that the SRNC takes the velocity vector information that it received from the UE and transmits said velocity vector information to the DRNC. An alternative is that the SRNC transmits a processed version of said the velocity vector information. An example of the latter might be that the SRNC has noted that the UE is travelling faster than a speed threshold. Thus, the SRNC knows that it is only interested of the macrocells. Instead of sending the complete velocity vector information to the DRNC for processing, the SRNC can simply send a request for macrocells in the neighbor set for the present active set. This request for macrocells may then be seen as velocity vector related information. In the same way the SRNC could e.g. request to have the cells in a specific area transmitted.

The DRNC may then use said processed or non-processed velocity vector information to filter the neighbor set for the active set in question and then transmit the filtered neighbor set to the UE—either directly or preferably via the SRNC.

It is to be noted that the present invention works equally well in all types of networks that in some way are using different sets of cells, disregarding what the sets and other parts of the network are called. Also e.g. the names on technologies for obtaining position, speed and direction may be called differently in different systems, which of course also is of no importance.

What is claimed is:

1. A method for use in a controller in a radio network including a number of cells, in which network a user equipment communicates with at least one cell defining an active set, the user equipment (UE) having a velocity vector including position, speed, and direction, comprising:

receiving information related to the velocity vector;

filtering a neighbor cell list associated with active set using the velocity vector related information to create a filtered neighbor cell list including filtering out fewer cells from the neighbor cell list when the speed of the user equipment is higher than when the speed is lower; and transmitting the filtered neighbor cell list to the user equipment thereby enabling measurement of pilot signal strength for cells in the filtered neighbor cell list, wherein when the network includes different hierarchical level cells, the filtering depends on the speed of the user equipment, the method further comprising:

filtering out from the neighbor cell list one or more larger cells when the speed is under a speed threshold, and filtering out from the neighbor cell list one or more smaller cells when the speed is over the speed threshold, and wherein when the network includes cells using different radio access technologies, the filtering depends on which radio access technology is used in the different cells.

2. A method according to claim 1, wherein making the filtering depends on a position of the user equipment and includes removing cells that are further away than a distance threshold, are outside a certain area, or have a pilot tone strength under a level threshold.

3. A method according to claim 1, wherein the filtering depends on the direction of the user equipment, the method further comprising:

filtering out one or more cells not in said direction.

4. A method according to claim 2, wherein when a distance threshold or a level threshold is used, the method further comprises:

changing the distance threshold or the level threshold depending on the speed of the user equipment.

5. A method according to claim 1, wherein when the network is close to another network, the filtering depends on which network different cells are connected.

6. A method according to claim 1, further comprising:

using GPS technology, a round trip time, or an observed time difference of arrival to estimate a position of the user equipment.

7. A method according to claim 1, further comprising:

using change in position to estimate a direction or a speed of the user equipment.

8. A method according to claim 1, further comprising:

using a Doppler effect in frequency to estimate a speed of the user equipment.

9. A method according to claim 1, wherein when the controller is a serving controller, the method further comprises:

receiving the neighbor cell list from a drift controller including extra cell information, and wherein the filtering also depends on the extra cell information.

10. A method according to claim 1, wherein when the controller is a drift controller, the method further comprises:

receiving a velocity vector related information from a serving controller, and wherein the filtering depends on the velocity vector related information and on extra cell information.

11. A method for use in a user equipment communicating with at least one cell defining an active set in a radio network, the user equipment having a velocity vector including position, speed, and direction, comprising:

transmitting information related to the velocity vector;

receiving a filtered neighbor cell list generated using the velocity vector related information and a neighbor cell list associated with the active set; and measuring pilot signal strength for the cells in the filtered neighbor cell list, wherein fewer cells are filtered out when the speed of the user equipment is higher than when the speed is lower, wherein when the network includes different hierarchical level cells, the filtering depends on the speed of the user equipment, the method further comprising:

filtering out from the neighbor cell list one or more larger cells when the speed is under a speed threshold, and filtering out from the neighbor cell list one or more smaller cells when the speed is over the speed threshold, and wherein when the network includes cells using different radio access technologies, the filtering depends on which radio access technology is used in the different cells.

12. A method according to claim 11, further comprising:

using GPS technology, round trip time, or observed time difference of arrival to estimate position of the user equipment.

13. A method according to claim 11, further comprising:

using change in position to estimate direction or speed of the user equipment.

14. A method according to claim 11, further comprising:

using a Doppler effect in frequency to estimate speed of the user equipment.

15. A controller for use in a radio network including a number of cells in which network a user equipment communicates with at least one cell defining an active set, the user equipment having a velocity vector including position, speed, and direction, wherein the controller is configured as follows:

to receive information related to the velocity vector;

to filter a neighbor cell list associated with the active set depending on the velocity vector information to create a filtered neighbor cell list; and to transmit the filtered neighbor cell list to the user equipment thereby enabling measurement by the user equipment of pilot signal strength for cells in the filtered neighbor cell list, wherein the controller is arranged to select a number of cells to be filtered out from the neighbor cell list depending on the speed of the user equipment so that fewer cells are filtered out from the neighbor cell list when the speed is higher than when the speed is lower, wherein when the network includes cells on different hierarchical levels, the controller is arranged to filter out from the neighbor cell list one or more larger cells when the user equipment speed is under a speed threshold, and to filter out from the neighbor cell list one or more of smaller cells when the user equipment speed is over the speed threshold, and wherein when the network includes cells using different radio access technologies, the controller is arranged to filter the neighbor cell list depending on which radio access technology is used in the different cells.

16. A controller according to claim 15, wherein depending on the position of the user equipment, the controller is arranged to filter out from the neighbor cell list one or more cells that are further away from the user equipment than a distance threshold, that are outside a certain area, or that have a pilot strength under a level threshold.

17. A controller according to claim 15, wherein depending on the direction of the user equipment, the controller is arranged to filter out from the neighbor cell list one or more of the cells that are not in said direction.

18. A controller according to claim 16, wherein the controller is arranged to change the distance threshold or the level threshold depending on the speed of the user equipment.

19. A controller according to claim 15, wherein when the network is close to another network, the controller is arranged to filter the neighbor cell list depending on which network different cells are connected.

20. A controller according to claims 15, wherein the controller is arranged to use GPS technology, round trip time, or observed time difference of arrival to estimate a position of the user equipment.

21. A controller according to claim 15, wherein the controller is arranged to use change in position to estimate a direction or a speed of the user equipment.

22. A controller according to claim 15, wherein the controller is arranged to use a Doppler effect in frequency to estimate a speed of the user equipment.

23. A controller according to claim 15, wherein the controller is a serving controller which is arranged to receive the neighbor cell list from a drift controller and extra cell information, and to filter the neighbor cell list depending on the extra cell information.

24. A controller according to claim 15, wherein the controller is a drift controller which is arranged to receive velocity vector related information from a serving controller, and to filter the neighbor cell list depending on the velocity vector related information and on extra cell information.

25. A user equipment for in use communicating with at least one cell defining an active set in a radio network and having a velocity vector including position, speed, and direction, wherein the user equipment is arranged to perform the following:

transmit information related to the velocity vector;

receive a filtered neighbor cell list created by filtering a neighbor cell list associated with the active set depending on the velocity vector related information; and measure a pilot signal strength for one or more cells in the filtered neighbor cell list, wherein fewer cells are filtered out when the speed of the user equipment is higher than when the speed is lower, wherein when the network includes different hierarchical level cells, the filtering depends on the speed of the user equipment, the neighbor cell list one or more larger cells have been removed from the list when the speed is under a speed threshold, and the neighbor cell list one or more smaller cells have been removed from the list when the speed is over the speed threshold, and wherein when the network includes cells using different radio access technologies, the filtering depends on which radio access technology is used in the different cells.

26. A user equipment according to claim 25, wherein the user equipment is arranged to use GPS technology, a round trip time, or an observed time difference of arrival to estimate a position of the user equipment.

27. A user equipment according to claim 25, wherein the user equipment is arranged to use a change in position to estimate a direction or a speed of the user equipment.

28. A user equipment according to claim 25, wherein the user equipment is arranged to use a Doppler effect in frequency to estimate a speed of the user equipment.

* * * * *